United States Patent
Cymbal et al.

(10) Patent No.: US 9,739,361 B2
(45) Date of Patent: Aug. 22, 2017

(54) VEHICLE STEERING COLUMN ASSEMBLY AND METHOD OF ASSEMBLING

(71) Applicant: Steering Solutions IP Holding Corporation, Saginaw, MI (US)

(72) Inventors: William D. Cymbal, Freeland, MI (US); Jeffrey E. Beyerlein, Frankenmuth, MI (US); Joel A. Bickel, Millington, MI (US); Daniel J. Diffin, Saginaw, MI (US); Alan G. Turek, Mayville, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 28 days.

(21) Appl. No.: 14/869,076

(22) Filed: Sep. 29, 2015

(65) Prior Publication Data

US 2017/0089442 A1    Mar. 30, 2017

(51) Int. Cl.
*F16H 57/00*    (2012.01)

(52) U.S. Cl.
CPC ..... *F16H 57/0037* (2013.01); *F16H 57/0025* (2013.01)

(58) Field of Classification Search
CPC .......................... F16H 57/0037; F16H 57/0025
USPC ......................................................... 74/492
See application file for complete search history.

(56) References Cited

U.S. PATENT DOCUMENTS

| | | | | |
|---|---|---|---|---|
| 4,967,858 A * | 11/1990 | Kotake | ..................... | B62D 6/10 180/444 |
| 5,878,832 A * | 3/1999 | Olgren | ..................... | B62D 6/10 180/444 |
| 6,378,647 B1 * | 4/2002 | Birsching | ............ | B62D 5/0409 180/444 |
| 8,234,947 B2 * | 8/2012 | Kurzmann | ................ | F16D 1/06 74/395 |
| 2009/0266640 A1 * | 10/2009 | Oshima | ..................... | B62D 5/04 180/444 |
| 2013/0160597 A1 * | 6/2013 | Masuda | ................. | B62D 1/181 74/493 |
| 2014/0352465 A1 * | 12/2014 | Chae | ....................... | F16H 19/04 74/30 |

* cited by examiner

*Primary Examiner* — Darlene P Condra
(74) *Attorney, Agent, or Firm* — Cantor Colburn LLP

(57) ABSTRACT

A vehicle steering column assembly includes a first shaft having a first shaft cavity extending from an end of the first shaft. Also included is a second shaft operatively coupled to the first shaft, the second shaft having a second shaft cavity disposed therein. Further included is a torsion bar disposed within the first shaft cavity and the second shaft cavity. Yet further included is a stop tooth extending from the first shaft. Also included is a worm gear defining a slot with a slot wall, a first portion of the slot wall configured to engage a first side of the stop tooth to define a first radial boundary of the worm gear, a second portion of the slot wall configured to engage a second side of the stop tooth to define a second radial boundary of the worm gear.

18 Claims, 4 Drawing Sheets

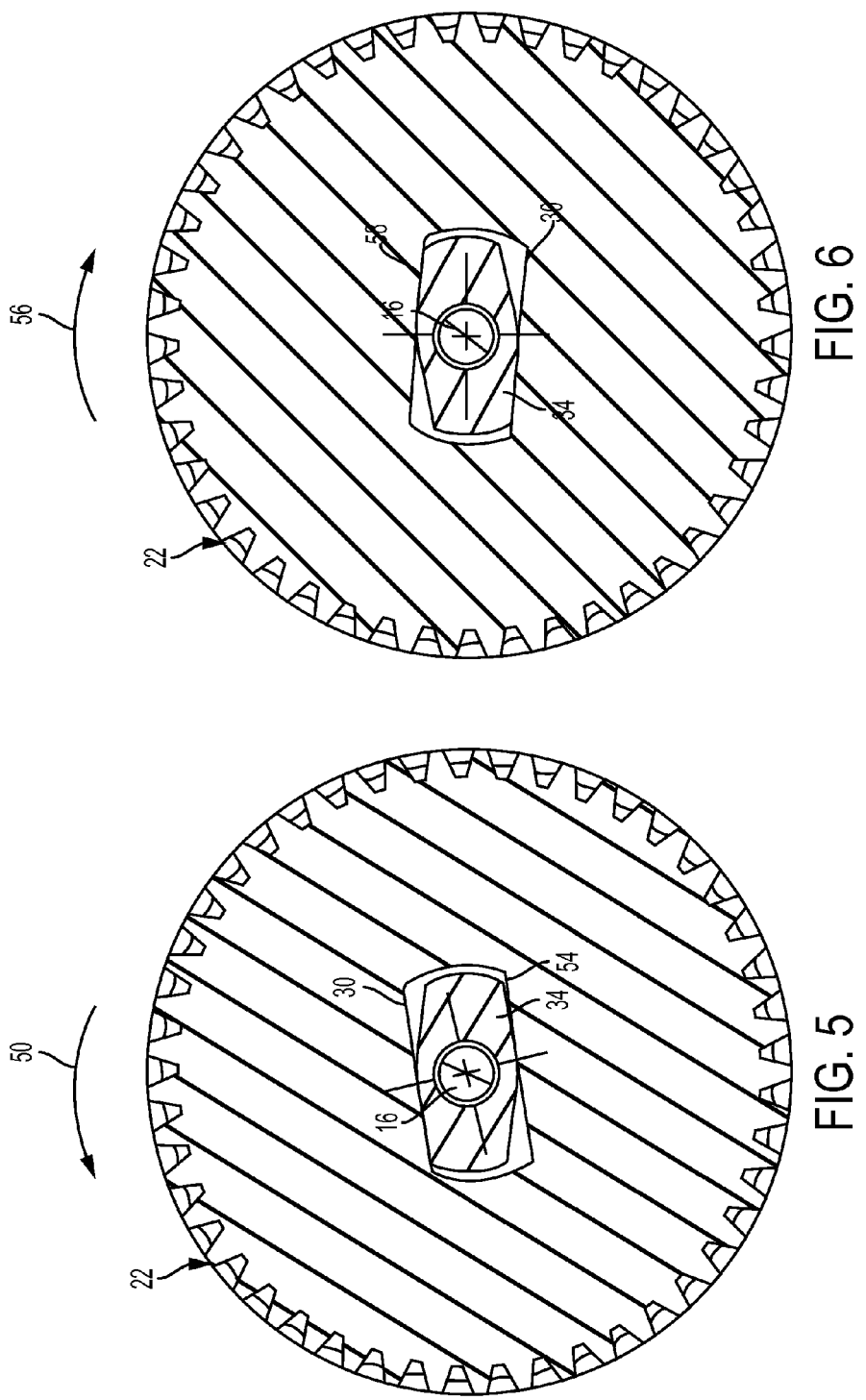

VEHICLE STEERING COLUMN ASSEMBLY AND METHOD OF ASSEMBLING

BACKGROUND OF THE INVENTION

The subject matter disclosed herein relates to vehicle steering columns and, more particularly, to a steering column with a centered torsion bar, as well as a method of assembling a steering column in manner that ensures a centered torsion bar.

Power steering systems in vehicles use actuators or a worm and worm gear to provide assist and sometimes include capabilities such as variable effort steering and torque overlay to provide a desired response in the systems. Many actuators use a torsion bar disposed within a valve to control the valve or other input measuring device as a function of torque, and to provide tactile feedback to the driver at the hand wheel.

The systems described above include a mechanical torsion bar disposed in a center cavity of an input shaft. The torsion bar is connected to an output shaft and the input shaft. The torsion bar imparts a torque on the steering wheel that provides a tactile response to a driver. In addition, the torsion bar ensures that the valve opening for a hydraulic power steering system is controlled as a function of the driver torque. In an electric power steering system, the deflection of the torsion bar is usually sensed with an electrical device such as a torque sensor. To ensure proper function of the torque sensor and to prevent unequal stress on the torsion bar, it is desirable for the torsion bar to twist equally in the clockwise and counterclockwise direction. The twisting of the torsion bar is limited by mechanical stops on the input and output shaft called stop teeth. However, the torsion bar installation process may inherently lead to challenges with centering the torsion bar.

SUMMARY OF THE INVENTION

In accordance with an exemplary embodiment of the invention, a vehicle steering column assembly includes a first shaft having a first shaft cavity extending from an end of the first shaft. Also included is a second shaft operatively coupled to the first shaft, the second shaft having a second shaft cavity disposed therein. Further included is a torsion bar disposed within the first shaft cavity and the second shaft cavity. Yet further included is a stop tooth extending from the first shaft. Also included is a worm gear defining a slot with a slot wall, a first portion of the slot wall configured to engage a first side of the stop tooth to define a first radial boundary of the worm gear, a second portion of the slot wall configured to engage a second side of the stop tooth to define a second radial boundary of the worm gear.

In accordance with another exemplary embodiment of the invention, a method of assembling a steering column assembly is provided. The method includes inserting a torsion bar into a first shaft cavity of the first shaft. The method also includes inserting the torsion bar into a second shaft cavity of a second shaft. The method further includes disposing a worm gear around a portion of the first shaft and the second shaft. The method yet further includes disposing a first portion of the worm gear slot wall into contact with a stop tooth extending from the first shaft to reach a first radial boundary position. The method also includes rotating the worm gear until a second portion of the worm gear wall contacts the stop tooth to reach a second radial boundary position. The method further includes recording the rotational angle during rotation of the worm gear. The method yet further includes rotating the worm gear one-half of the recorded angle.

In accordance with yet another exemplary embodiment of the invention, a method of assembling a steering column assembly is provided. The method includes press fitting a torsion bar into a first shaft cavity of the first shaft. The method also includes disposing a worm gear around a portion of the first shaft. The method further includes inserting the torsion bar into a second shaft cavity of the second shaft. The method yet further includes rotating the worm gear in a first rotational direction to a first radial boundary position. The method also includes rotating the worm gear in a second rotational direction that is opposite to the first rotational direction to a second radial boundary position, the distance between the first radial boundary position and the second radial boundary position defining an angle. The method further includes rotating the worm gear in the first rotational direction one-half of the angle.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 5 is a cross-sectional view of the vehicle steering column assembly taken along line B-B illustrating the worm gear in a first rotational boundary position; and FIG. 6 is a cross-sectional view of the vehicle steering column assembly taken along line B-B illustrating the worm gear in a second rotational boundary position.

DETAILED DESCRIPTION

Referring now to the Figures, where the invention will be described with reference to specific embodiments, without limiting same, a steering column assembly is provided. Numerous contemplated types of vehicles may benefit from the embodiments disclosed herein, including an automobile, for example.

Power steering systems may incorporate a torsion bar in hydraulic and electric actuators. The torsion bar typically facilitates measurement of driver torque by sensing the deflection of the torsion bar and radial movement of the input shaft relative to the output shaft. In addition, the torsion bar also provides the necessary torque coupling between the driver the rest of the steering system, thus providing a desired tactile "feel" to the user. The torsion bar assists with a return to center movement of the steering column assembly. Therefore, it is desirable to ensure centering of the torsion bar during assembly of the steering column assembly. The embodiments described herein assist with that effort.

Figure 1:
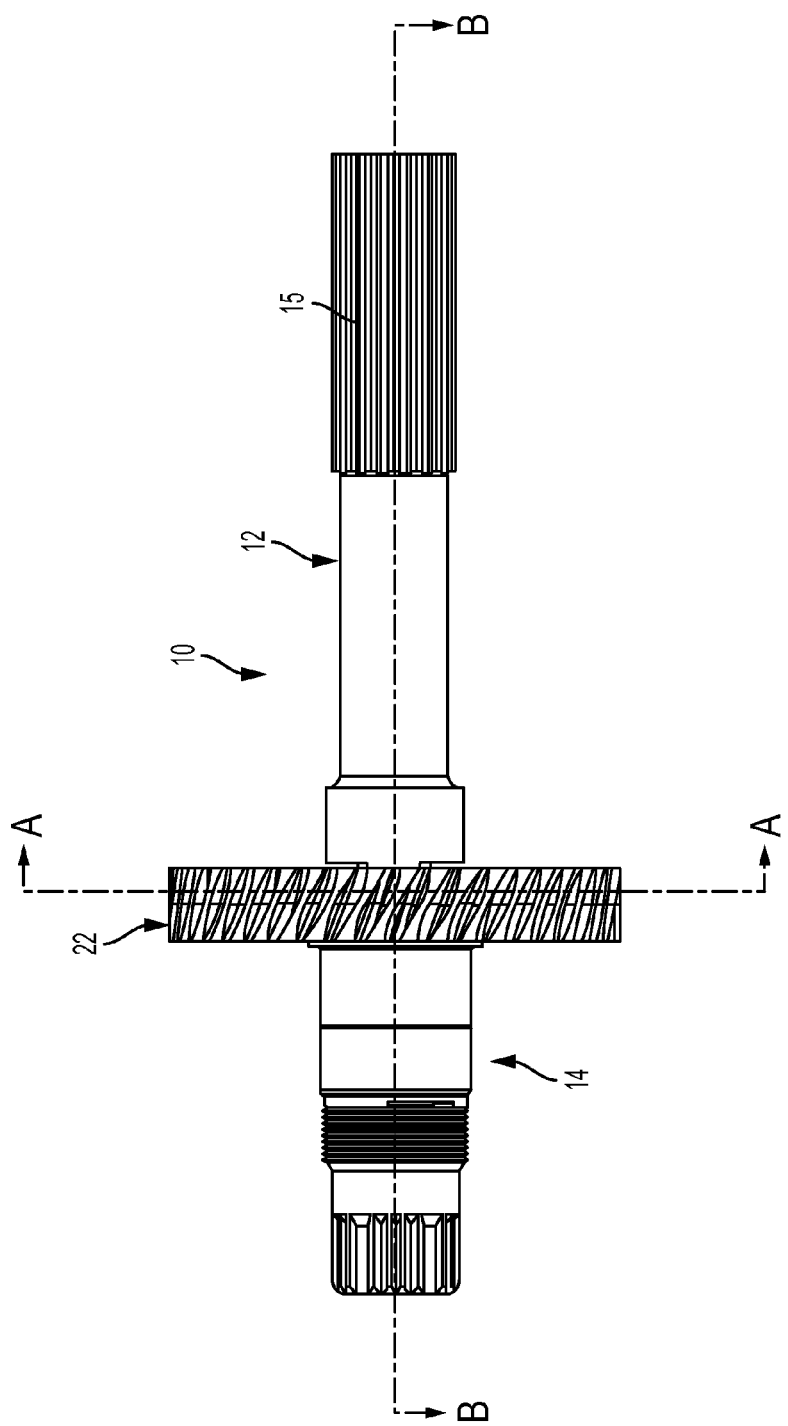
FIG. 1 is a side, elevational view of a vehicle steering column assembly.
Figure 2:
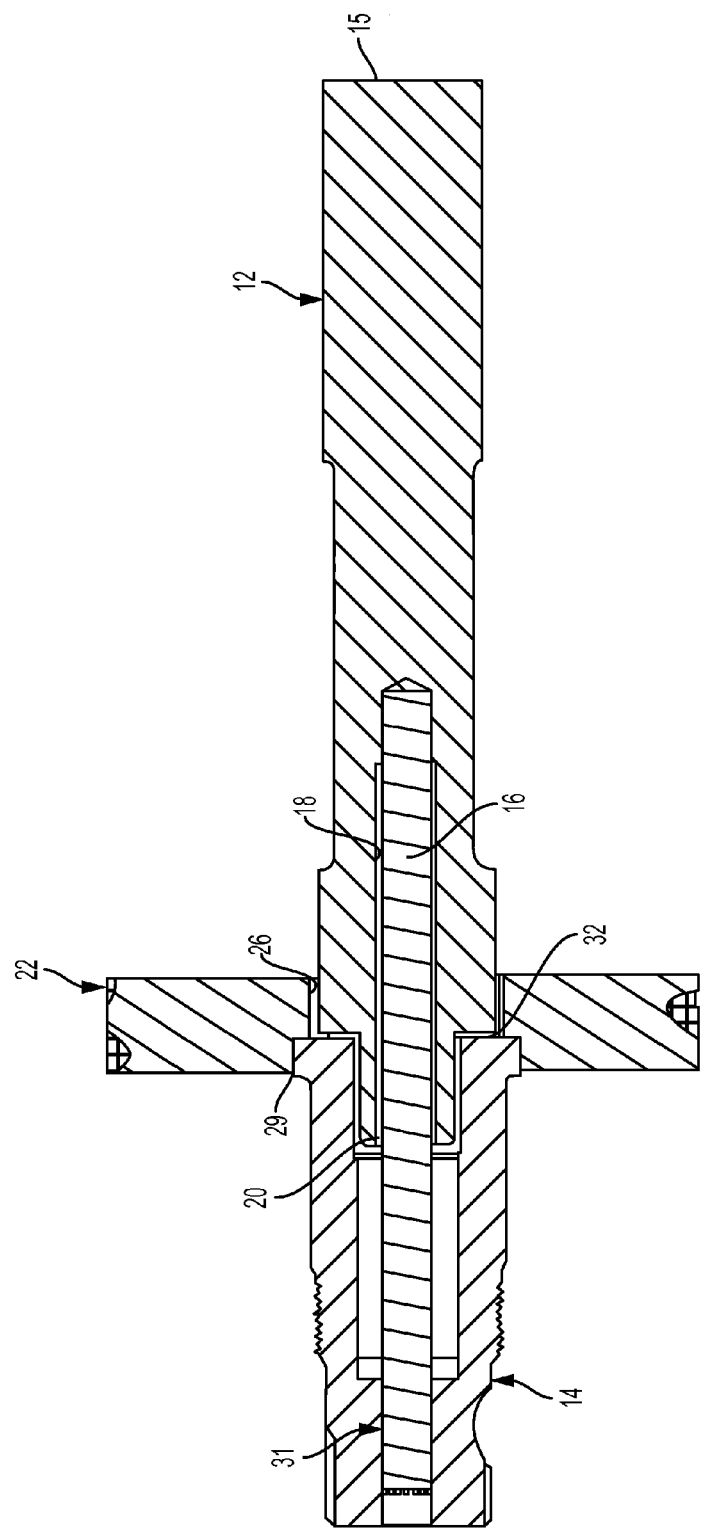
FIG. 2 is a cross-sectional view of the vehicle steering column assembly taken along line A-A.
Figure 4:
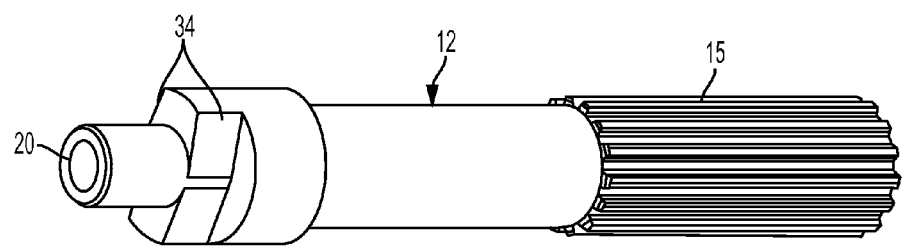
FIG. 4 is a perspective view of an input shaft of the vehicle steering column assembly.

Referring now to FIGS. 1, 2 and 4, a steering column assembly 10 is illustrated. The steering column assembly 10 includes an input shaft 12, also referred to herein as a first shaft. The input shaft 12 is operatively coupled to a steering wheel (not shown) and an end 15 and rotates in response to rotation of the steering wheel by a user. The input shaft 12 is operatively coupled to an output shaft 14, also referred to herein as a second shaft, with a torsion bar 16, as will be further described below. Upon final assembly, the torsion bar 16 imparts a torque on the steering wheel that provides a tactile response to the driver.

The torsion bar 16 is inserted into a cavity 18 of the input shaft 12. The cavity 18 is substantially centrally disposed about a longitudinal axis of the input shaft 12 and extends from an end 20 of the input shaft 12, such that the end 20 is open to receive the torsion bar 16. The torsion bar 16 is coupled to the input shaft 12 by press fitting the torsion bar 16 into the cavity 18. The torsion bar 16 extends out of the cavity 18 in a protruding manner subsequent to press fitting the torsion bar 16 into its coupled condition with the input shaft 12.

Figure 3:
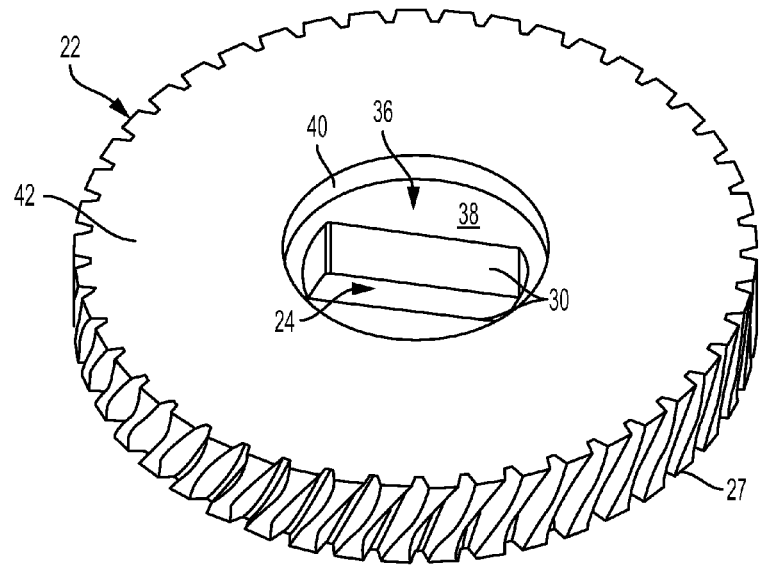
FIG. 3 is a perspective view of a worm gear of the vehicle steering column assembly.

Referring to FIG. 3, with continued referenced to FIGS. 1, 2 and 4, the worm gear 22 defines a substantially centrally disposed recess 36 that is defined by a recess perimeter wall 40 and a recess wall 38. The recess 36 extends from a second side 42 of the worm gear 22 and is dimensioned to receive and surround a portion of the output shaft 14 therein. The slot 24 extends from the first side 27 of the worm gear 22 to the recess wall 38. The dimensions of the slot 24 are controlled to provide a desired angular rotation between the input shaft 12, the output shaft 14 and the worm gear 22, with the torsion bar 16 being employed as a centering spring, as described in detail below.

A worm gear 22 is placed on the input shaft 12 by sliding a slot 24 defined by the worm gear 22 over the input shaft 12. In addition, the recessed perimeter 40 is loosely fit over an output shaft hub 29 of the output shaft 14.

Upon placing the worm gear 22 and the output shaft 14 into operative engagement, the input shaft 12 is operatively coupled to the output shaft 14 via engagement of input and output spline block teeth (not shown) for radial locating. As the input shaft 12 and the output shaft 14 are placed into engagement, the portion of the torsion bar 16 that protrudes from the cavity 18 of the input shaft 12 is inserted into a cavity 31 of the output shaft 14. The cavity 31 of the output shaft 14 is substantially centrally disposed about a longitudinal axis of the output shaft 14 and extends from an end 32 of the output shaft 14, such that the end 32 is open to receive the torsion bar 16. The torsion bar 16 is coupled to the output shaft 14 by press fitting the torsion bar 16 into the cavity 31. Extending from the input shaft 12 is a stop tooth 34. Also during engagement of the input shaft 12 and the output shaft 14, the worm gear slot 24 is placed over the input shaft stop tooth 34.

Referring now to FIGS. 5 and 6, in the press fit condition of the torsion bar 16, the worm gear 22 is still free to rotate proximate the output shaft hub 29. With the input shaft 12, and consequently the torsion bar 16, held in a fixed angular position, the worm gear 22 is rotated in a first rotational direction 50 until a first rotational boundary position (FIG. 5) is reached. The first rotational boundary position is defined by contact between a first portion 54 of the slot wall 30 and the stop tooth 34. The worm gear 22 is then rotated in a second rotational direction 56 that is opposite to the first rotation direction 56. Rotation in the second rotational direction 56 is made until a second rotational boundary position (FIG. 6) is reached. The second rotational boundary position is defined by contact between a second portion 58 of the slot wall 30 and the stop tooth 34. Using measurement instrumentation, the angle of rotation between the first rotational boundary position and the second rotational boundary position is measured and recorded. The worm gear 22 is then rotated one-half of the recorded angle to ensure that the worm gear slot 24 is centered relative to the input shaft block tooth 34 when the torsion bar 16 is in the free state. The worm gear 22 and the output shaft 14 are coupled to each other, such as with a welding method.

Advantageously, the embodiments described above reduce or eliminate any off-centering effects inherently associated with coupling operations (e.g., press fitting) made between the torsion bar 16 and the input shaft 12 and/or output shaft 14, thereby ensuring proper function of the torque sensor during vehicle operation.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, what is claimed is:

1. A vehicle steering column assembly comprising:
    a first shaft having a first shaft cavity extending from an end of the first shaft;
    a second shaft operatively coupled to the first shaft, the second shaft having a second shaft cavity disposed therein;
    a torsion bar disposed within the first shaft cavity and the second shaft cavity;
    a stop tooth extending from the first shaft; and
    a worm gear defining a slot with a slot wall, a first portion of the slot wall configured to engage a first side of the stop tooth to define a first radial boundary of the worm gear, a second portion of the slot wall configured to engage a second side of the stop tooth to define a second radial boundary of the worm gear.

2. The vehicle steering column assembly of claim 1, the slot extending from a first side of the worm gear toward a second side of the worm gear.

3. The vehicle steering column assembly of claim 2, the slot extending partially through the worm gear.

4. The vehicle steering column assembly of claim 2, the slot extending fully through the worm gear.

5. The vehicle steering column assembly of claim 2, the worm gear comprising a recess extending from the second side of the worm gear to a recess wall, the recess defined by a recess wall and a recess perimeter wall.

6. The vehicle steering column assembly of claim 5, the slot extending to the recess wall.

7. The vehicle steering column assembly of claim 5, the recess perimeter wall surrounding a portion of the second shaft.

8. A method of assembling a steering column assembly comprising:
    inserting a torsion bar into a first shaft cavity of the first shaft;
    inserting the torsion bar into a second shaft cavity of a second shaft;

disposing a worm gear around a portion of the first shaft and the second shaft, the worm gear defining a slot with a slot wall;

disposing a first portion of the slot wall into contact with a stop tooth extending from the first shaft to reach a first radial boundary position;

rotating the worm gear until a second portion of the slot wall contacts the stop tooth to reach a second radial boundary position;

recording the rotational angle during rotation of the worm gear; and rotating the worm gear one-half of the recorded angle.

9. The method of claim 8, further comprising press fitting the torsion bar into the first shaft cavity prior to disposing a first portion of the slot wall into contact with the stop tooth.

10. The method of claim 8, further comprising fixing the rotational position of the first shaft while disposing the first portion of the worm gear into the first radial boundary position and while rotating the worm gear to the second radial boundary position.

11. The method of claim 8, further comprising welding the second shaft to the worm gear.

12. The method of claim 11, wherein the second shaft is welded to the worm gear after rotating the worm gear one-half of the recorded angle.

13. A method of assembling a steering column assembly comprising:

press fitting a torsion bar into a first shaft cavity of the first shaft;

disposing a worm gear around a portion of the first shaft;

inserting the torsion bar into a second shaft cavity of the second shaft;

rotating the worm gear in a first rotational direction to a first radial boundary position;

rotating the worm gear in a second rotational direction that is opposite to the first rotational direction to a second radial boundary position, the distance between the first radial boundary position and the second radial boundary position defining an angle; and rotating the worm gear in the first rotational direction one-half of the angle.

14. The method of claim 13, wherein the first radial boundary position is defined by contact between a first portion of a worm gear slot wall and a stop tooth extending from the first shaft, the second radial boundary position defined by contact between a second portion of the worm gear slot wall and the stop tooth.

15. The method of claim 13, further comprising fixing a rotational position of the first shaft while disposing the worm gear into the first radial boundary position and while rotating the worm gear to the second radial boundary position.

16. The method of claim 13, further comprising welding the second shaft to the worm gear.

17. The method of claim 16, wherein the second shaft is welded to the worm gear after rotating the worm gear one-half of the angle.

18. A method of assembling a steering column assembly comprising:

press fitting a torsion bar into a first shaft cavity of the first shaft;

disposing a slot defined by a worm gear around a stop tooth of the first shaft;

press fitting the torsion bar into a second shaft cavity of a second shaft; and centering the slot of the worm gear relative to the stop tooth subsequent to press fitting of the torsion bar with the first shaft and the second shaft.

* * * * *